(12) United States Patent
Tyree

(10) Patent No.: US 6,543,794 B1
(45) Date of Patent: Apr. 8, 2003

(54) SHOPPING CART SANITARY HANDLE COVER

(76) Inventor: Sandra Tyree, 138 Charlotte Dr., Evington, VA (US) 24550

( * ) Notice: Subject to any disclaimer, the term of this patent is extended or adjusted under 35 U.S.C. 154(b) by 0 days.

(21) Appl. No.: 09/707,611

(22) Filed: Nov. 7, 2000

(51) Int. Cl.[7] ................................................. B62B 5/00
(52) U.S. Cl. ................................................. 280/33.992
(58) Field of Search ..................... 280/33.992, 33.993; 16/114.1; 606/235; 150/105, 154, 107, 100, 104, 109; 2/247

(56) References Cited

U.S. PATENT DOCUMENTS

| | | | |
|---|---|---|---|
| 3,866,649 A | | 2/1975 | Bringmann |
| 4,186,859 A | * | 2/1980 | Frankfort et al. ............ 224/205 |
| 4,655,502 A | | 4/1987 | Houllis |
| 4,805,937 A | | 2/1989 | Boucher et al. |
| 4,881,746 A | * | 11/1989 | Andreesen ............. 280/33.992 |
| 4,955,914 A | | 9/1990 | Caniglia et al. |
| 5,215,319 A | | 6/1993 | Farris |
| 5,238,293 A | * | 8/1993 | Gibson ....................... 297/229 |
| 5,285,833 A | * | 2/1994 | Haxby ........................ 150/102 |
| 5,429,377 A | * | 7/1995 | Duer ..................... 280/33.992 |
| 5,678,888 A | * | 10/1997 | Sowell et al. .......... 297/256.17 |
| 5,715,571 A | | 2/1998 | Fasano |
| 5,722,672 A | * | 3/1998 | Frederick ............... 280/33.992 |
| 5,788,604 A | * | 8/1998 | Brown et al. ................ 280/642 |
| 5,820,142 A | | 10/1998 | Duer |
| 5,829,835 A | * | 11/1998 | Rogers et al. ......... 297/256.17 |
| 5,953,790 A | | 9/1999 | Auxier |
| 5,961,018 A | * | 10/1999 | Abelbeck et al. ........... 224/584 |
| 6,065,764 A | | 5/2000 | Moseley |
| 6,322,150 B1 | * | 11/2001 | Harper et al. ............... 297/468 |

* cited by examiner

*Primary Examiner*—Paul N. Dickson
*Assistant Examiner*—Laura B. Rosenberg
(74) *Attorney, Agent, or Firm*—Dale J. Ream

(57) ABSTRACT

A sanitary handle cover for a shopping cart comprises a first semi-flexible sheet of a vinyl construction and a second sheet of fabric superimposed thereon and heat bonded thereto. Corresponding lateral edges of first and second sheets define a width dimension that is sufficient such that the sheets may be wrapped about a shopping cart handle bar. The width dimension is also sufficient such that a portion of the first sheet overlaps a portion of the second sheet. Circular hook and loop fasteners are arranged in a spaced apart configuration along the longitudinal edges that overlap so as to securely maintain the cover on the handle bar. Spring clip fasteners depend from opposed corresponding lateral edges of first and second sheets such that the cover may be coupled to a bag or purse and be used as a carrying strap therefor. A pocket is fixedly attached to the inner surface of the first sheet and has an opening adjacent corresponding lateral edges for holding a pen while shopping.

2 Claims, 3 Drawing Sheets

SHOPPING CART SANITARY HANDLE COVER

BACKGROUND OF THE INVENTION

The present invention relates generally to shopping cart or stroller handle covers and, more particularly, to a sanitary handle cover that is easily removable from a shopping cart or stroller handle for use as a bag carrying strap.

The use of metal or plastic shopping carts are widespread in supermarkets and large retail stores. Young children placed in such a cart, and particularly those in the three to four month range, tend to suck on the cart handle bar or stroller restraining bar. This is obviously an unsanitary practice. The same practice exists with children placed in strollers having a front restraining bar. Another problem with young children in shopping carts is the potential for injury if the child's head or mouth impacts the handle bar due to a sudden movement.

Various devices have been proposed in the art for covering or padding the handle bar of a shopping cart. Although assumably effective for their intended purposes, these devices do not provide for convenient storage of the device that will ensure that the cover is always available when shopping with a young child. Further, existing devices do not provide other shopping conveniences such as convenient storage of a writing instrument while using a shopping cart.

Therefore, it is desirable to have a cover for a shopping cart handle which prevents the spread of germs or injury to a young child in the cart. Further, it is desirable to have a sanitary handle cover for a shopping cart that may be converted easily into a bag carrying strap when not wrapped about a handle bar in addition, it is desirable to have a handle cover that provides convenient storage for a writing implement while shopping.

SUMMARY OF THE INVENTION

A shopping cart sanitary handle cover according to the present invention includes first and second substantially rectangular sheets having inner and outer surfaces. The first sheet is constructed of a semi-flexible vinyl material while the second sheet is constructed of a fabric material. The second sheet is superimposed upon the first sheet and is adhesively heat bonded thereto. The first and second sheets include corresponding first and second longitudinal edges extending between corresponding opposed lateral edges so as to form a single rectangular cover.

The corresponding lateral edges define a width dimension such that the cover may be wrapped about a shopping cart handle bar or stroller restraining bar with the inner surface of the first sheet bearing against the bar. Portions of the cover overlap one another at opposed longitudinal edges of respective sheets. Circular hook and loop fasteners spaced apart along respective longitudinal edges engage one another to securely maintain the cover about a handle bar.

Spring clip fasteners are coupled to opposed corresponding lateral edges of the first and second sheets for clipping the cover to the D-rings of a bag or purse when the cover is not wrapped about a shopping cart handle member. The handle cover further includes a pocket fixedly attached to the inner surface of the first sheet and defining an opening for receiving a pen therein.

Therefore, a general object of this invention is to provide a shopping cart handle cover that is sanitary, washable, and reusable.

Another object of this invention is to provide a handle cover, as aforesaid, having an impermeable layer that separates a cart handle bar from a young child's mouth.

Still another object of this invention is to provide a handle cover, as aforesaid, that is easy to attach and remove from a cart handle bar.

Yet another object of this invention is to provide a handle cover, as aforesaid, having a clip member extending from opposed longitudinal ends thereof for using the cover as strap for a purse or diaper bag.

A further object of this invention is to provide a handle cover, as aforesaid, having a durable outer fabric layer.

A still further object of this invention is to provide a handle cover, as aforesaid, Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
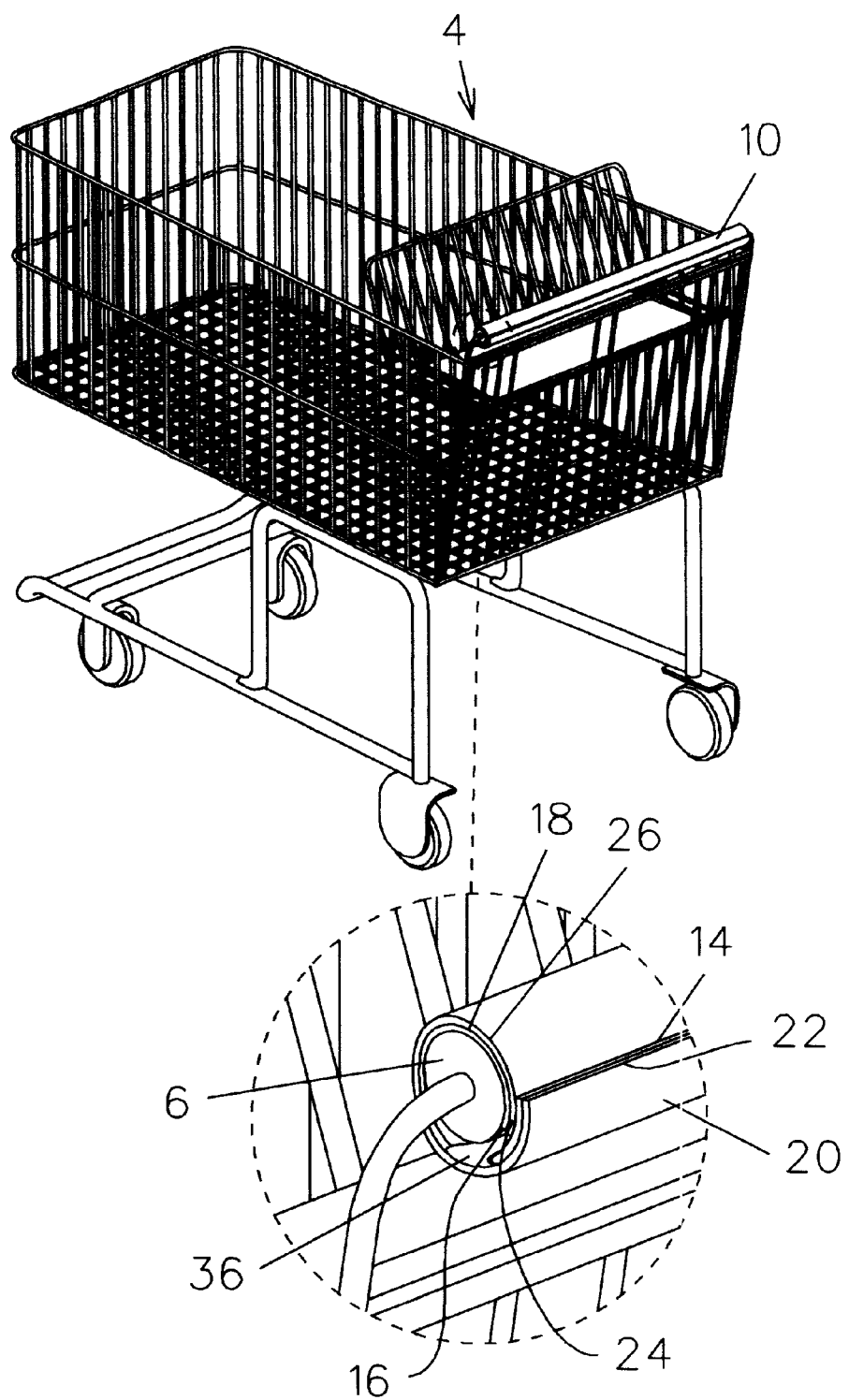
FIG. 1 is a perspective view of a sanitary cover member according to the preferred embodiment of the present invention attached to a shopping cart handle bar with an enlarged isolated view of an end of the cover.
Figure 2:
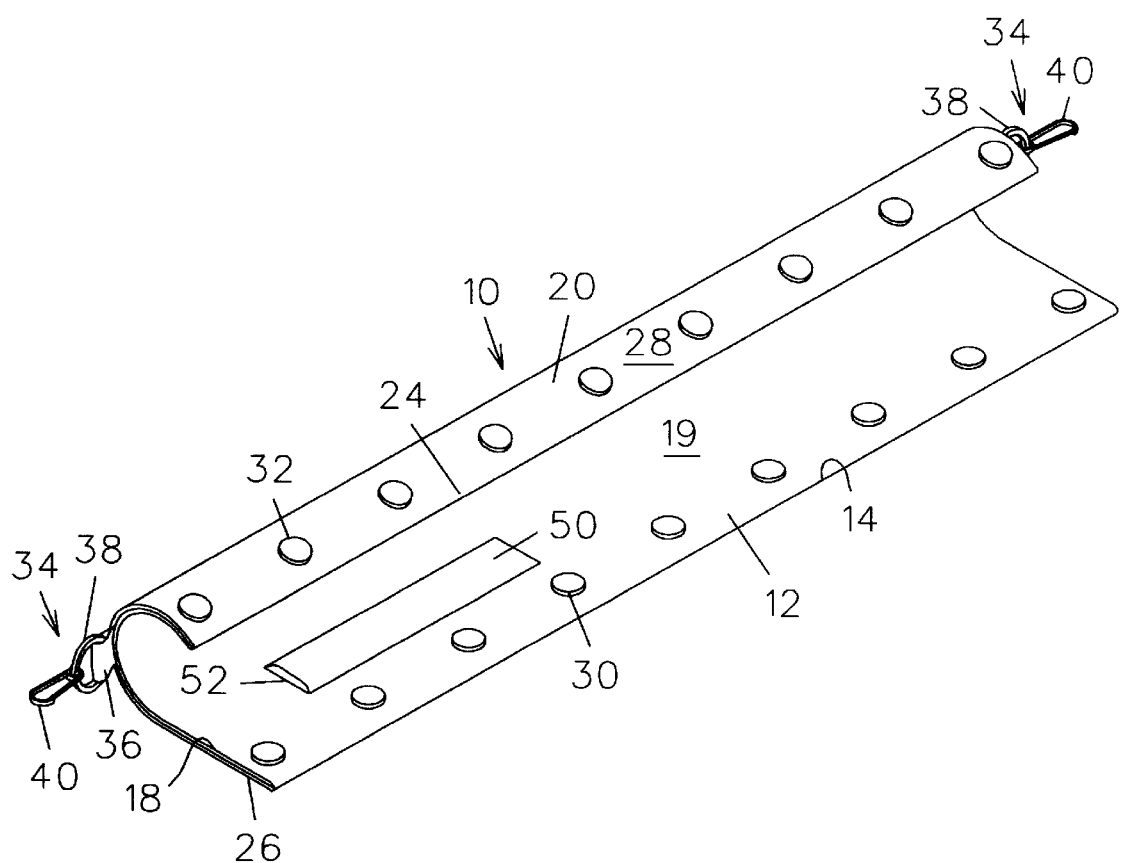
FIG. 2 is a perspective view of a sanitary cover as in FIG. 1 removed from the shopping cart in a substantially unwrapped configuration.
Figure 3:
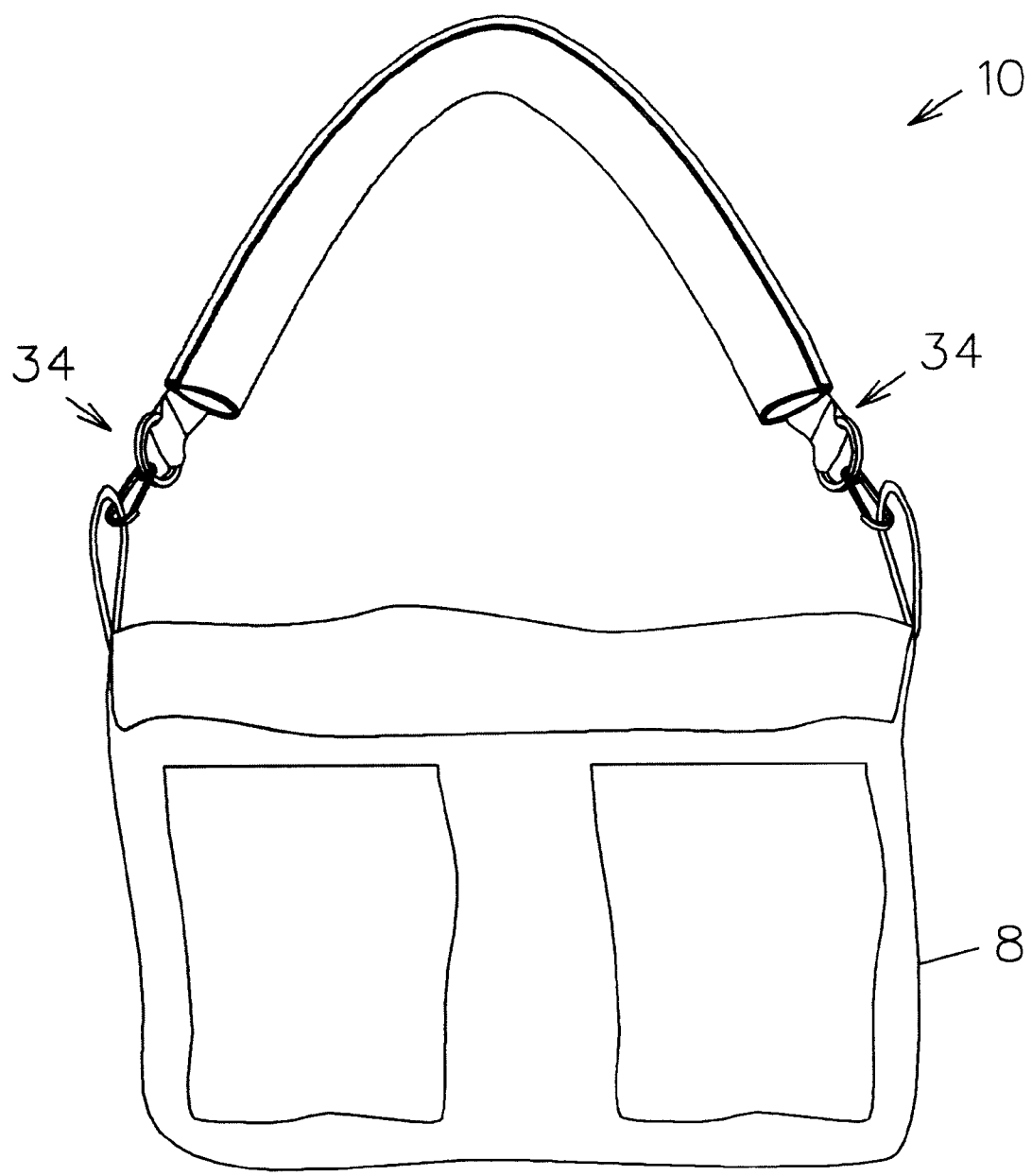
FIG. 3 is a front view of a sanitary cover as in FIG. 1 removed from the shopping cart and connected to a bag.

A shopping cart sanitary handle cover 10 according to a preferred embodiment of the present invention will now be described with reference to FIGS. 1–3 of the accompanying drawings. The handle cover 10 includes first 12 and second 20 sheets having substantially rectangular configurations with substantially similar length and width dimensions. As shown in FIGS. 1 and 2, the first sheet 12 includes first 14 and second 16 longitudinal edges extending between opposed lateral edges 18. Likewise, the second sheet 20 includes first 22 and second 24 longitudinal edges extending between opposed lateral edges 26. Accordingly, corresponding longitudinal and lateral edges of the first 12 and second 20 sheets lie adjacent one another when the second sheet 20 is superimposed upon the first sheet 12.

Preferably, the first sheet 12 is constructed of a semi-flexible vinyl material such as polyvinyl chloride although other plastics would also work. An inner surface 19 of the first sheet 12 is generally smooth while the outer surface thereof is coated with an adhesive substance. The second sheet 20 is constructed of a fabric material, the inner surface 19 of the second sheet 20 being superimposed upon the outer surface of the first sheet 12. The two sheets 12, 20 are heat bonded together and therefore fixedly attached.

A plurality of circular hook fasteners 30, such as VELCRO fasteners, are mounted in spaced apart relation on the inner surface 19 of the first sheet 12 along the first longitudinal edge 14 thereof (FIG. 2). Similarly, a plurality of circular loop fasteners 32, such as VELCRO, are mounted in spaced apart relation on the outer surface 28 of the second sheet 20 along the second longitudinal edge 24 thereof. The hook 30 and loop 32 fasteners are spaced evenly such that they engage one another when portions of the first 12 and second 20 sheets adjacent corresponding second edges 16, 24 are overlapped by portions of the first 12 and second 20 sheets adjacent corresponding first edges 14, 22, as to be further described below.

A spring clip fastener 34 depends from each lateral end of the cover 10. More particularly, each fastener 34 includes a flexible loop portion 36 fixedly attached between corresponding lateral edges 18, 26 and adapted to fold between a first position along the inner surface 19 of the first sheet 12 and a second position extending away from the lateral edges. A D-ring 38 is coupled to each loop 36 and a spring clip 40 is coupled to each D-ring 38. Each spring clip 40 may be removably coupled to a conventional D-ring or loop of a diaper bag, purse, or the like. Accordingly, the loop may be folded inwardly when the cover 10 is wrapped about a handle bar 6 such that the fastener 34 is hidden from view. Alternately, the loop 36-may be extended outwardly to allow the spring clip 40 to be clipped to a bag 8 or the like when the cover 10 is not wrapped about a handle bar 6 (FIG. 3).

The cover 10 further includes a storage pocket 50 fixedly attached to the inner surface of the first sheet 12. The pocket 50 comprises a rectangular piece of fabric or plastic having three edges connected to the inner surface 19 and defining an open end 52 substantially adjacent one lateral end of the cover 10 so as to selectively receive a writing instrument therein.

In use, the cover 10 may be clipped to the rings or loops of a diaper bag 8 or purse and used as a strap therefor when not needed as a cover for a shopping cart 4 or stroller handle bar 6. When needed to cover a handle bar 6, the cover 10 may be removed from the bag with one-handed operation of each spring clip 40. The hook and loop fasteners may then be separated and the cover 10 may be wrapped about the handle bar 6. A pen may be inserted in the pocket 50 prior to again engaging the fasteners, if desired. The pen may later be accessed merely by separating the outermost hook and loop fasteners. When the cover 10 is no longer needed, it may be unwrapped from the handle bar 6 by pulling the overlapped sheets apart to disengage the fasteners. The cover 10 may then be conveniently clipped to a bag so as to be readily available when needed again.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. A shopping cart sanitary handle cover, comprising:
   a first substantially rectangular semi-flexible sheet having a generally smooth inner surface and an outer surface;
   a second fabric sheet having an outer surface and an inner surface fixedly attached to said outer surface of said first sheet, said second sheet being superimposed upon said first sheet, said first and second sheets having corresponding first and second longitudinal edges extending between corresponding lateral edges;
   said corresponding lateral edges of said first and second sheets defining a width sufficient to wrap said first and second sheets about a handle bar of a shopping cart with a portion of said inner surface of said first sheet along said first longitudinal edge thereof overlapping a portion of said outer surface of said second sheet along said second longitudinal edge thereof;
   a plurality of circular hook elements having hook fasteners arranged in a linear spaced apart configuration along said first longitudinal edge of said inner surface of said first sheet;
   a plurality of circular loop elements having loop fasteners arranged in a linear spaced apart configuration along said second longitudinal edge of said outer surface of said second sheet, said hook and loop elements being spaced apart so as to engage one another when said first and second sheets are wrapped about said handle bar to securely maintain the cover thereon;
   a storage pocket fixedly attached to said inner surface of said first sheet and extending longitudinally therealong and along said plurality of hook elements whereby to be inaccessible to an infant situated in a shopping cart when said first and second sheets are scrapped about said handle bar, said pocket having a fabric construction and a generally rectangular elongate configuration forming a closed end displaced from a lateral edge of said first sheet and defining an opening adj lateral edge, said opening adapted to receive a pen therein;
   wherein corresponding hook and loop elements may be selectively separated whereby to unwrap a selected portion of said first and second sheets from said handle bar for access to said opening of said storage pocket;
   a pair of fasteners extending longitudinally from opposed corresponding lateral edges of said first and second sheets, each fastener adapted to be removably coupled to a purse or bag, each fastener including:
      a flexible loop portion fixedly attached to a respective lateral edge and adapted to fold between a first position along said inner surface of said first sheet so as to be selectively hidden from view when said first and second sheets are wrapped about said handle bar and a second position extending away from said corresponding lateral edges when said first and second sheets are not wrapped about said handle bar;
      a D-ring coupled to said loop portion; and
      a spring clip coupled to said D-ring for removable attachment to a purse or bag.

2. The handle cover as in claim 1 wherein said first sheet is of a semi-flexible vinyl material and said inner surface of said second sheet is adhesively heat bonded to said outer surface of said first sheet.

* * * * *